United States Patent
Chivukula et al.

(10) Patent No.: US 12,028,213 B2
(45) Date of Patent: *Jul. 2, 2024

(54) SYSTEMS AND METHODS FOR VALIDATING A CONTAINER NETWORK FUNCTION FOR DEPLOYMENT

(71) Applicant: Verizon Patent and Licensing Inc., Basking Ridge, NJ (US)

(72) Inventors: Arun K. Chivukula, Hyderabad (IN); Vishal Awasthy, Shimla (IN); Harish Dhandapani, Chennai (IN); Raghavender Parigi, Hyderabad (IN); Sathyam Bollini, Hyderabad (IN); Venkata Guravareddy Butukuri, Guntur (IN); Abhishek Kumar, Bengaluru (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,096

(22) Filed: Dec. 28, 2022

(65) Prior Publication Data

US 2023/0135001 A1 May 4, 2023

Related U.S. Application Data (63) Continuation of application No. 17/661,598, filed on May 2, 2022, now Pat. No. 11,552,850, which is a continuation of application No. 17/361,623, filed on Jun. 29, 2021, now Pat. No. 11,336,525.

(51) Int. Cl.
| | |
|---|---|
| H04L 41/0869 | (2022.01) |
| H04L 41/0631 | (2022.01) |
| H04L 41/0659 | (2022.01) |
| H04L 41/0823 | (2022.01) |
| H04L 41/0893 | (2022.01) |

(52) U.S. Cl.
CPC ...... *H04L 41/0869* (2013.01); *H04L 41/0645* (2013.01); *H04L 41/0661* (2023.05); *H04L 41/0836* (2013.01); *H04L 41/0893* (2013.01)

(58) Field of Classification Search
None
See application file for complete search history.

(56) References Cited

U.S. PATENT DOCUMENTS

| | | | |
|---|---|---|---|
| 10,938,638 B2 | 3/2021 | Andrianov et al. | |
| 2014/0317293 A1 | 10/2014 | Shatzkamer | |
| 2016/0212012 A1 | 7/2016 | Young et al. | |
| 2018/0270124 A1* | 9/2018 | Chugtu | G06F 8/60 |

(Continued)

*Primary Examiner* — Mohamed Ibrahim (57) ABSTRACT

A device may receive CNF data identifying a CNF to be deployed in a network. The device may perform multiple levels of validation associated with deploying the CNF. The device may determine, based on performing the multiple levels of validation, whether one or more issues are associated with deploying the CNF in the network. The one or more issues may include one or more of: a connectivity issue, a package issue, a network functions virtualization orchestrator (NFVO) issue, or a network functions virtualization infrastructure (NFVI) issue. The device may perform one or more actions based on determining whether the one or more issues are associated with the deploying the CNF in the network.

20 Claims, 10 Drawing Sheets

(56) References Cited

U.S. PATENT DOCUMENTS

| | | |
|---|---|---|
| 2019/0205186 A1* | 7/2019 | Zhang ................... G06F 9/4843 |
| 2019/0258796 A1 | 8/2019 | Paczkowski et al. |
| 2019/0327621 A1 | 10/2019 | Chou et al. |
| 2019/0373472 A1* | 12/2019 | Smith ................. H04W 12/108 |
| 2020/0067782 A1 | 2/2020 | Yousaf |
| 2021/0286638 A1 | 9/2021 | Fan et al. |

* cited by examiner

SYSTEMS AND METHODS FOR VALIDATING A CONTAINER NETWORK FUNCTION FOR DEPLOYMENT

RELATED APPLICATION

This application is a continuation of U.S. patent application Ser. No. 17/661,598, entitled "SYSTEMS AND METHODS FOR VALIDATING A CONTAINER NETWORK FUNCTION FOR DEPLOYMENT," filed May 2, 2022 (now U.S. Pat. No. 11,552,850), which is a continuation of U.S. patent application Ser. No. 17/361,623, entitled "SYSTEMS AND METHODS FOR VALIDATING A CONTAINER NETWORK FUNCTION FOR DEPLOYMENT," filed Jun. 29, 2021 (now U.S. Pat. No. 11,336,525), the contents of each of which are incorporated herein by reference in their entireties.

BACKGROUND

A container or cloud-native network function (CNF) is a software implementation of a network function, traditionally performed on a physical device (e.g., a router, a bridge, a switch, a gateway, a firewall, and/or the like), but created and deployed in a cloud computing environment. A CNF may provide various network functions packaged into docker containers (e.g., networking microservices) and may be deployed in private, public, or hybrid cloud infrastructures.

DETAILED DESCRIPTION OF PREFERRED EMBODIMENTS

The following detailed description of example implementations refers to the accompanying drawings. The same reference numbers in different drawings may identify the same or similar elements.

CNF deployment is a complex and time-consuming process. The deployment process is complex because the process involves multiple stakeholders at various levels (e.g., network functions virtualization infrastructure (NFVI) (e.g., networking hardware and software needed to support and connect virtual network functions in carrier networks), Kubernetes, a network functions virtualization orchestrator (NFVO) (e.g., a component that standardizes functions of virtual networking to increase interoperability of software-defined networking elements), the package management applications, the configuration management systems, and/or the like). At every point in the deployment process there are chances of failure of deployment of the CNF, which results in lost time and money. Thus, current techniques for deploying a CNF consume computing resources (e.g., processing resources, memory resources, communication resources, and/or the like), networking resources, and/or other resources associated with deploying an inoperable CNF, attempting to correct the inoperable CNF, handling customer complaints associated with the inoperable CNF, creating a new CNF for the inoperable CNF, and/or the like.

Some implementations described herein provide a validation system that validates a CNF for deployment. For example, the validation system may receive CNF data identifying a CNF to be deployed in a network and a configuration of the CNF and may validate connectivity between resources to be utilized to deploy the CNF in the network to generate connectivity data indicating whether one or more connectivity issues exist. The validation system may validate packages to be utilized to deploy the CNF in the network to generate package data indicating whether one or more package issues exist and may validate an NFVO to be utilized to deploy the CNF in the network to generate NFVO data indicating whether one or more NFVO issues exist. The validation system may validate an NFVI to be utilized to deploy the CNF in the network to generate NFVI data indicating whether one or more NFVI issues exist and may determine whether one or more issues are associated with deploying the CNF in the network based on the connectivity data, the package data, the NFVO data, and the NFVI data. The validation system may perform one or more actions based on determining whether one or more issues are associated with deploying the CNF in the network.

In this way, the validation system validates a CNF for deployment. For example, the validation system may check all prerequisite tasks for deploying a CNF and enable the CNF to be deployed more quickly. The validation system may perform various levels of validations associated with deploying the CNF and may generate a recommendation with respect to deploying the CNF. Thus, implementations described herein may conserve computing resources, networking resources, and other resources that would have otherwise been consumed by deploying an inoperable CNF, attempting to correct the inoperable CNF, handling customer complaints associated with the inoperable CNF, creating a new CNF for the inoperable CNF, and/or the like.

FIGS. 1A-1G are diagrams of an example 100 associated with validating a CNF for deployment. As shown in FIGS. 1A-1G, example 100 includes a user device 105 and a validation system 110. Further details of the user device 105 and the validation system 110 are provided elsewhere herein.

Figure 1A:
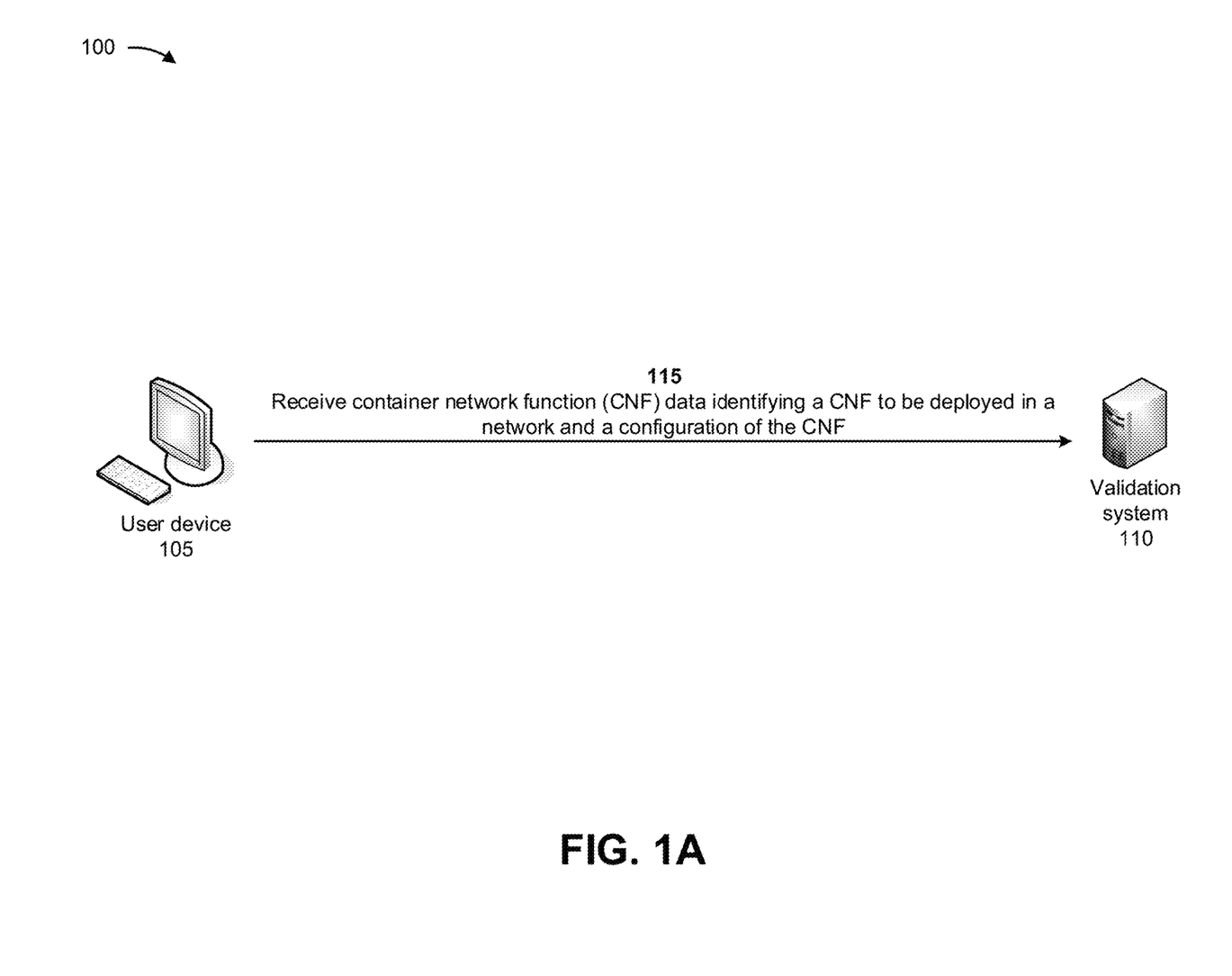
FIGS. 1A-1G are diagrams of an example associated with validating a CNF for deployment.

As shown in FIG. 1A, and by reference number 115, the validation system 110 may receive, from the user device 105, CNF data identifying a CNF to be deployed in a network and a configuration of the CNF. For example, a user of the user device 105 may wish to deploy a particular CNF (e.g., a virtual implementation of a router, a bridge, a switch, a gateway, a firewall, and/or the like) in the network and may select, via the user device 105, the particular CNF from a marketplace of registered CNFs. The user of the user device 105 may also specify a configuration for the particular CNF. The configuration may include data identifying CNF docker images to be extracted and uploaded to a registry, Helm charts to be extracted and uploaded to the registry, parameter files and scripts to be extracted and uploaded to software for tracking changes in the CNF data, a cloud service archive (CSAR) package to be uploaded or retrieved from a vendor, and/or the like.

Figure 1B:
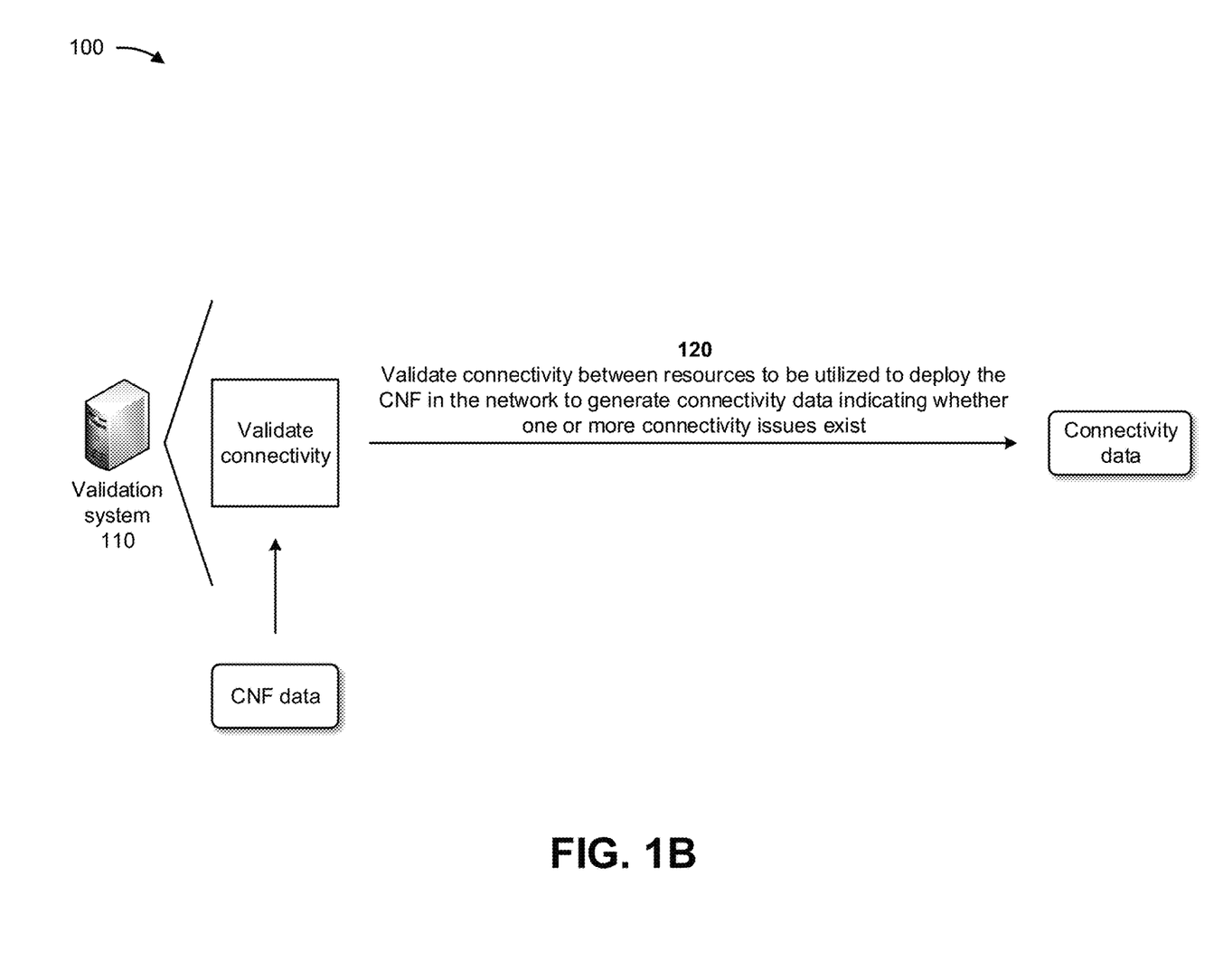

As shown in FIG. 1B, and by reference number 120, the validation system 110 may validate connectivity between resources to be utilized to deploy the CNF in the network to generate connectivity data indicating whether one or more connectivity issues exist. For example, when validating the connectivity between the resources to be utilized to deploy the CNF, the validation system 110 may validate connectivity between the NFVO and container infrastructure service management (e.g., a system that provides mechanisms for lifecycle management of containers that host application components as services or functions) to generate first connectivity data indicating whether one or more connectivity issues exist between the NFVO and the container infrastructure service management. The validation system 110 may also validate connectivity between the network and the NFVO to generate second connectivity data indicating whether one or more connectivity issues exist between the network and the NFVO.

In some implementations, the connectivity data includes the first connectivity data and the second connectivity data. In some implementations, the one or more connectivity issues include a configuration management issue, a container infrastructure service management issue, a package manager issue, a repository issue, and/or the like.

Figure 1C:
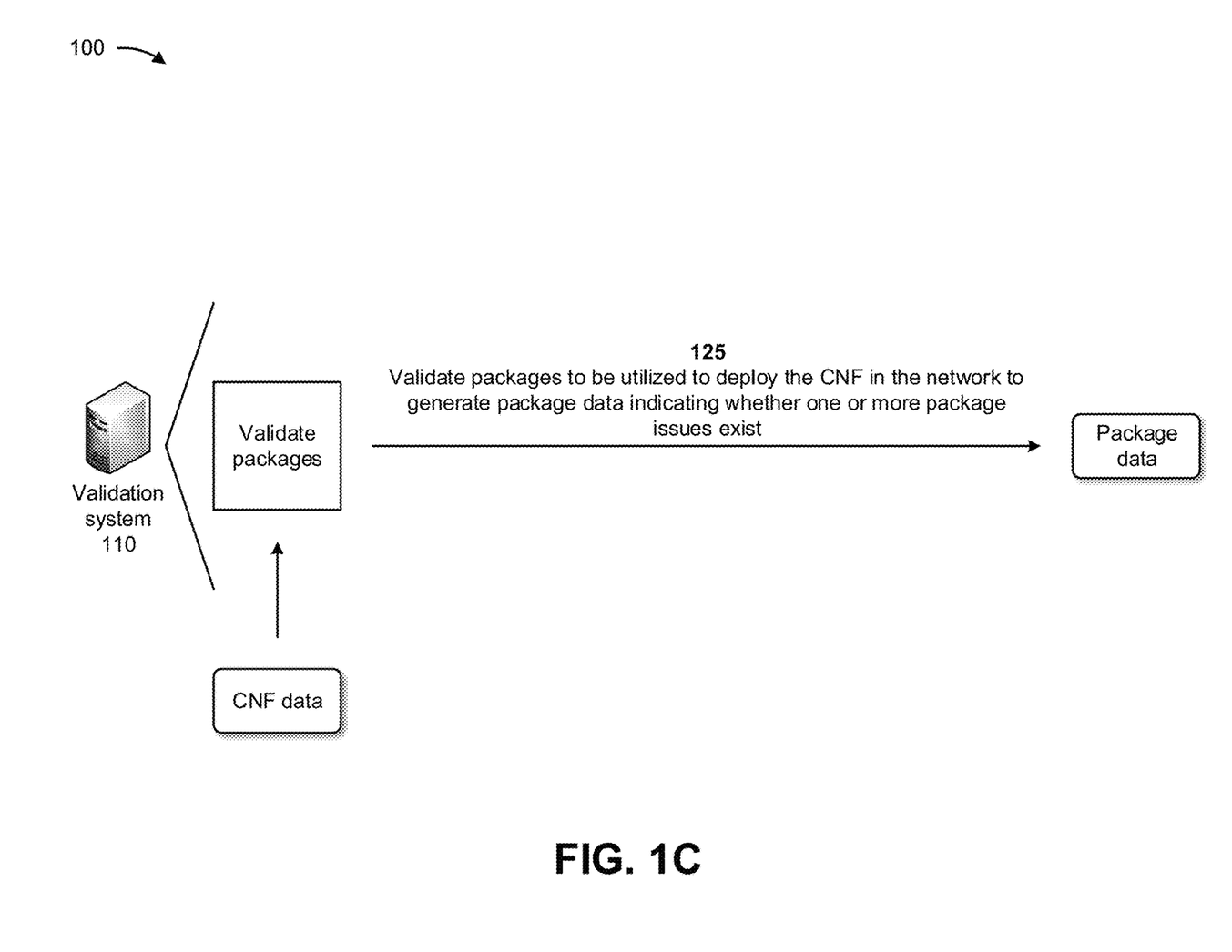

As shown in FIG. 1C, and by reference number 125, the validation system 110 may validate packages (e.g., software packages) to be utilized to deploy the CNF in the network to generate package data indicating whether one or more package issues exist. For example, when validating the packages to be utilized to deploy the CNF in the network, the validation system 110 may validate the packages to generate first package data indicating whether one or more package issues exist with the packages. The validation system 110 may validate artifacts associated with the packages, to generate second package data indicating whether one or more package issues exist with the artifacts associated with the packages.

In some implementations, the package data includes the first package data and the second package data. In some implementations, the one or more package issues include a missing artifact issue associated with one of the packages, an issue with an image push to a local registry, and/or the like.

Figure 1D:
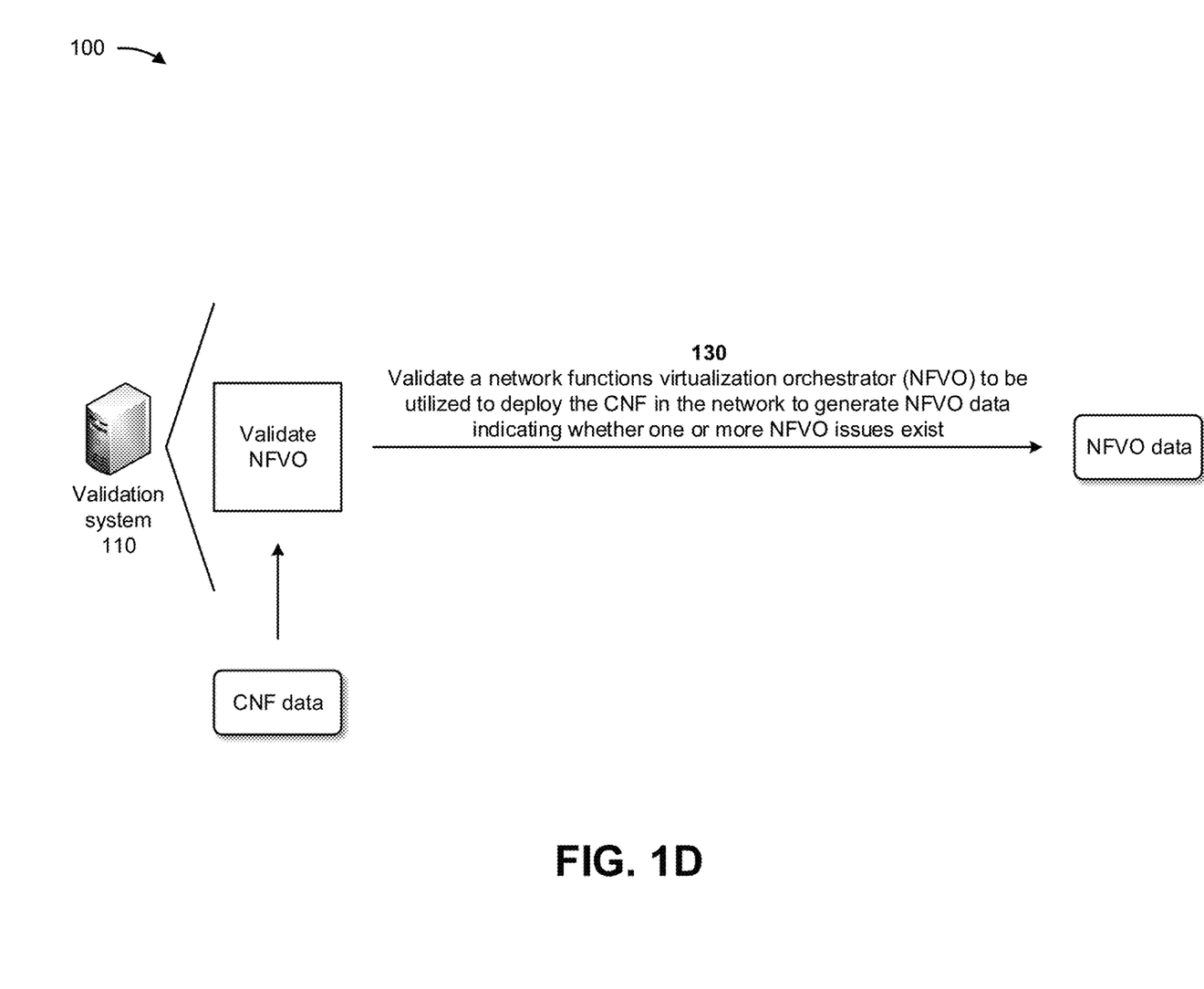

As shown in FIG. 1D, and by reference number 130, the validation system 110 may validate an NFVO to be utilized to deploy the CNF in the network to generate NFVO data indicating whether one or more NFVO issues exist. For example, when validating the NFVO to be utilized to deploy the CNF in the network, the validation system 110 may validate package cataloging by the NFVO to generate first NFVO data indicating whether one or more issues exist with the package cataloging by the NFVO. The validation system 110 may also validate functionality of the NFVO to generate second NFVO data indicating whether one or more issues exist with the functionality of the NFVO. The validation system 110 may validate resources discovery, associated with the NFVO, to generate third NFVO data indicating whether one or more issues exist with the resources discovery.

In some implementations, the NFVO data includes the first NFVO data, the second NFVO data, and the third NFVO data. In some implementations, the one or more NFVO issues include a data center discovery issue, an improper hierarchy issue, an unattached package issue, and/or the like.

Figure 1E:
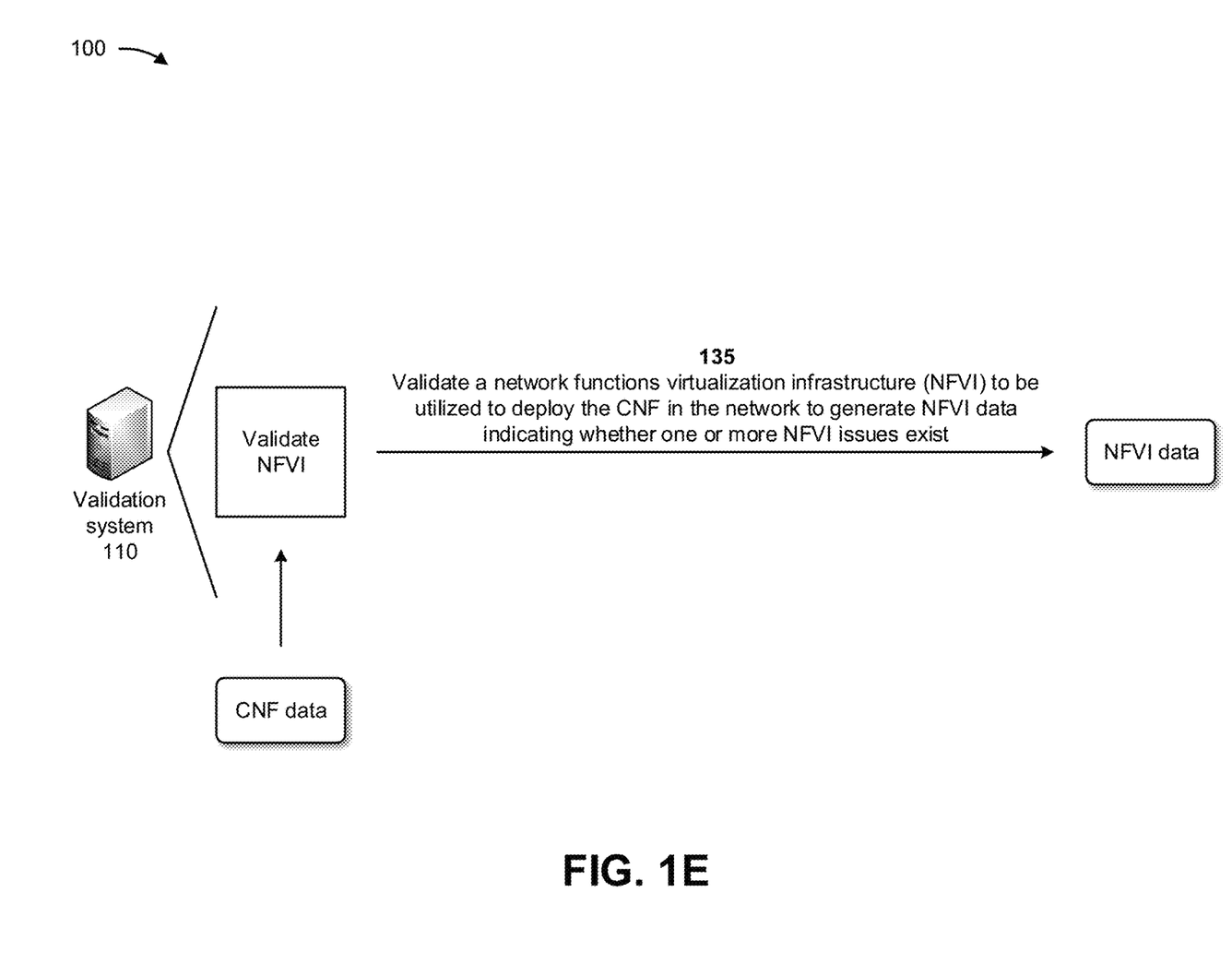

As shown in FIG. 1E, and by reference number 135, the validation system 110 may validate an NFVI to be utilized to deploy the CNF in the network to generate NFVI data indicating whether one or more NFVI issues exist. For example, when validating the NFVI to be utilized to deploy the CNF in the network, the validation system 110 may validate a namespace (e.g., a set of names that are used to identify and refer to objects of various kinds), associated with the NFVI, to generate first NFVI data indicating whether one or more issues exist with the namespace associated with the NFVI. The validation system 110 may also validate a quota (e.g., limits on resource utilization), associated with the NFVI, to generate second NFVI data indicating whether one or more issues exist with the quota associated with the NFVI. The validation system 110 may validate a namespace label (e.g., a key/value pair that is attached to an object), associated with the NFVI, to generate third NFVI data indicating whether one or more issues exist with the namespace label.

In some implementations, the NFVI data includes the first NFVI data, the second NFVI data, and the third NFVI data. In some implementations, the one or more NFVI issues include a resource quota availability issue, a service account related issue, a missing label issue, an improperly configured role-based access control issue, and/or the like.

Figure 1F:
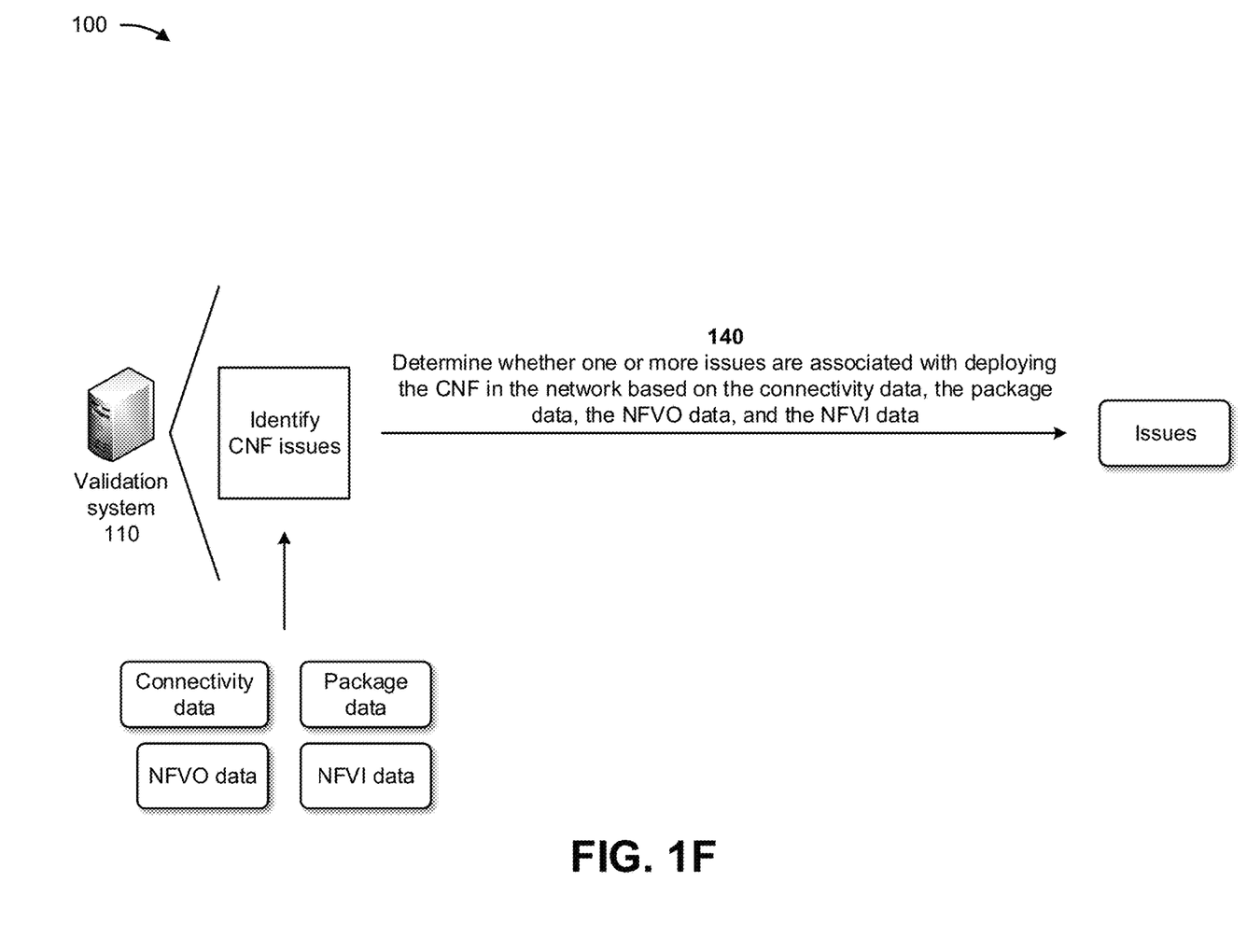

As shown in FIG. 1F, and by reference number 140, the validation system 110 may determine whether one or more issues are associated with deploying the CNF in the network based on the connectivity data, the package data, the NFVO data, and the NFVI data. For example, the validation system 110 may determine whether one or more issues are associated with deploying the CNF in the network based on whether one or more connectivity issues exist in the connectivity data, whether one or more package issues exist in the package data, whether one or more NFVO issues exist in the NFVO data, and whether one or more NFVI issues exist in the NFVI data. In some implementations, if no issues are identified in the connectivity data, the package data, the NFVO data, and the NFVI data, the validation system 110 may determine that there are no issues associated with deploying the CNF in the network. In some implementations, if a criticality of issues are identified in the connectivity data, the package data, the NFVO data, and the NFVI data, and the criticality of issues satisfies a threshold criticality, the validation system 110 may determine that there are one or more issues associated with deploying the CNF in the network. If the criticality of issues fails to satisfy the threshold criticality, the validation system 110 may determine that there are no issues associated with deploying the CNF in the network.

In some implementations, the validation system 110 may determine the criticality of issues based on a criticality of connectivity issues in the connectivity data, a criticality of package issues in the package data, a criticality of NFVO issues in the NFVO data, and a criticality of NFVI issues in the NFVI data. Alternatively, or additionally, the validation system 110 may apply weights to the criticality of connectivity issues in the connectivity data, the criticality of package issues in the package data, the criticality of NFVO issues in the NFVO data, and the criticality of NFVI issues in the NFVI data, to generate weighted criticalities. The validation system 110 may determine the criticality of issues based on the weighted criticalities.

Figure 1G:
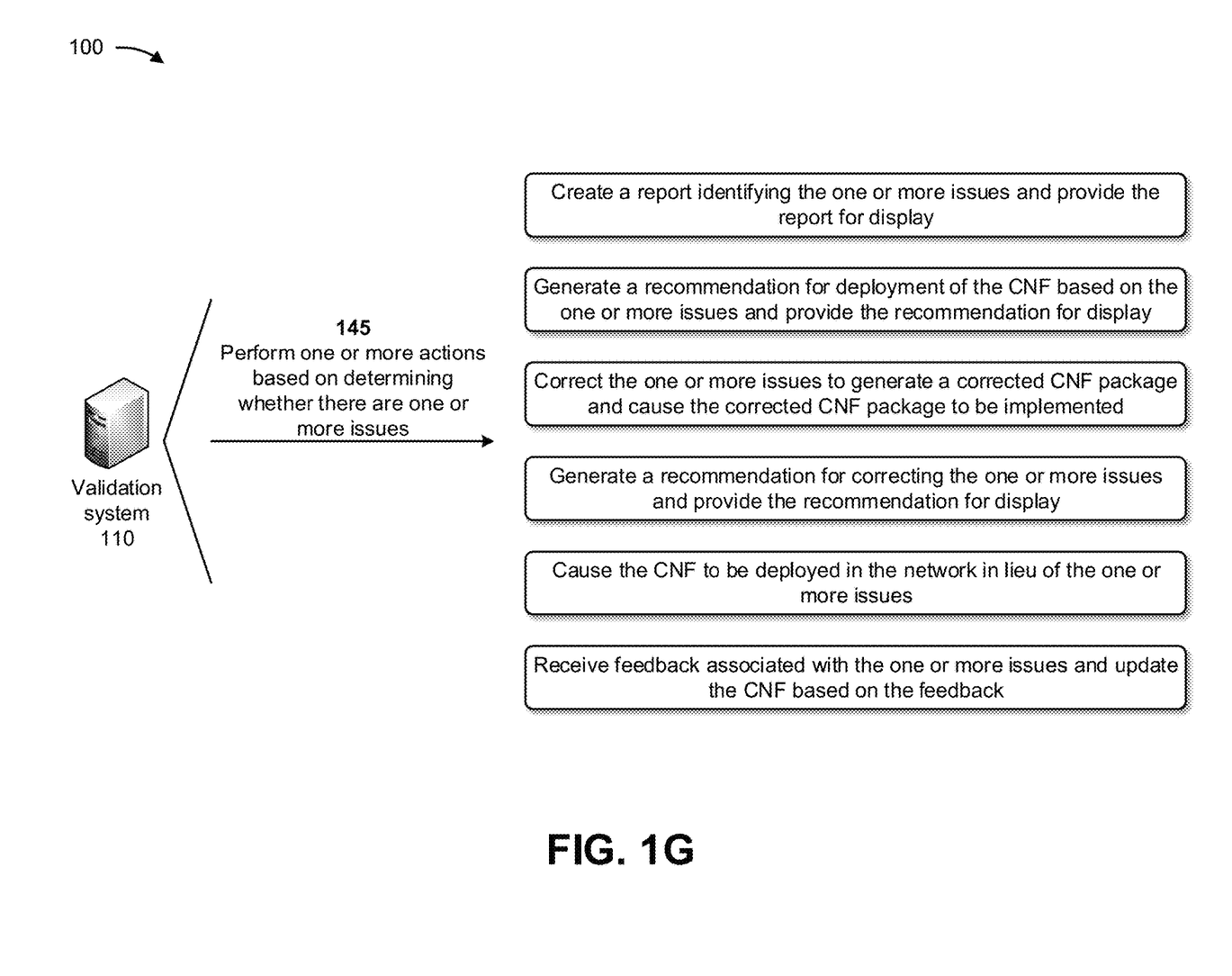

As shown in FIG. 1G, and by reference number 145, the validation system 110 may perform one or more actions based on determining whether there are one or more issues. For example, the one or more actions may include the validation system 110 creating a report identifying the one or more issues and providing the report for display. For example, the validation system 110 may generate a report that includes an indication of whether one or more issues are associated with deploying the CNF in the network and descriptions of the one or more issues (e.g., if any). The validation system 110 may provide the report to the user device 105, and the user device 105 may display the report to the user of the user device 105. The user may decide whether to deploy the CNF in the network based on the report. In this way, the validation system 110 conserves computing resources, networking resources, and other resources that would have otherwise been consumed by deploying an inoperable CNF, attempting to correct the inoperable CNF, handling customer complaints associated with the inoperable CNF, and/or the like.

In some implementations, the one or more actions include the validation system 110 generating a recommendation for deployment of the CNF based on the one or more issues and providing the recommendation for display. For example, the validation system 110 may generate a recommendation recommending deployment of the CNF in the network when a criticality of the one or more issues fails to satisfy a threshold criticality. The validation system 110 may generate another recommendation, recommending that the CNF not be deployed in the network, when the criticality of the one or more issues satisfies the threshold criticality. The validation system 110 may provide the recommendation to the user device 105, and the user device 105 may display the recommendation to the user of the user device 105. The user may decide whether to deploy the CNF in the network based on the recommendation. In this way, the validation system 110 conserves computing resources, networking resources, and other resources that would have otherwise been consumed by deploying an inoperable CNF, handling customer complaints associated with the inoperable CNF, and/or the like.

In some implementations, the one or more actions include the validation system 110 correcting the one or more issues to generate a corrected CNF package and causing the corrected CNF package to be implemented. For example, the validation system 110 may correct the one or more issues associated with deploying the CNF in the network. Correcting the issues may modify the CNF and may generate the corrected CNF package. The validation system 110 may cause the corrected CNF package to be implemented by instructing one or more other systems and/or the network to implement the corrected CNF package. In this way, the validation system 110 conserves computing resources, networking resources, and other resources that would have otherwise been consumed by deploying an inoperable CNF, handling customer complaints associated with the inoperable CNF, and/or the like.

In some implementations, the one or more actions include the validation system 110 generating a recommendation for correcting the one or more issues and providing the recommendation for display. For example, the validation system 110 may generate a recommendation that recommends corrections that eliminate the one or more issues associated with deploying the CNF in the network. The validation system 110 may provide the recommendation to the user device 105, and the user device 105 may display the recommendation to the user of the user device 105. The user may decide whether to implement the corrections that eliminate the one or more issues based on the recommendation. In this way, the validation system 110 conserves computing resources, networking resources, and other resources that would have otherwise been consumed by deploying an inoperable CNF, handling customer complaints associated with the inoperable CNF, creating a new CNF for the inoperable CNF, and/or the like.

In some implementations, the one or more actions include the validation system 110 causing the CNF to be deployed in the network in lieu of the one or more issues. For example, the validation system 110 may cause the CNF to be deployed in the network when a criticality of the one or more issues fails to satisfy a threshold criticality. The validation system 110 may cause the CNF to be deployed in the network by instructing one or more other systems and/or the network to deploy the CNF in the network. In this way, the validation system 110 conserves computing resources, networking resources, and other resources that would have otherwise been consumed by deploying an inoperable CNF, attempting to correct the inoperable CNF, and/or the like.

In some implementations, the one or more actions include the validation system 110 receiving feedback associated with the one or more issues and updating the CNF based on the feedback. For example, the validation system 110 may provide data identifying the one or more issues to the user device 105. The user device 105 may display the data identifying the one or more issues to the user of the user device 105. The user may provide feedback on the one or more issues to the user device 105, and the user device 105 may provide the feedback to the validation system 110. The validation system 110 may update the CNF based on the feedback by utilizing the feedback to correct the one or more issues. In this way, the validation system 110 conserves computing resources, networking resources, and other resources that would have otherwise been consumed by deploying an inoperable CNF, attempting to correct the inoperable CNF, creating a new CNF for the inoperable CNF, and/or the like.

In this way, the validation system 110 validates a CNF for deployment. For example, the validation system 110 may check all prerequisite tasks for deploying a CNF and enable the CNF to be deployed more quickly. The validation system 110 may perform various levels of validations associated with deploying the CNF and may generate a recommendation with respect to deploying the CNF. Thus, implementations described herein may conserve computing resources, networking resources, and other resources that would have otherwise been consumed by deploying an inoperable CNF, attempting to correct the inoperable CNF, handling customer complaints associated with the inoperable CNF, creating a new CNF for the inoperable CNF, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
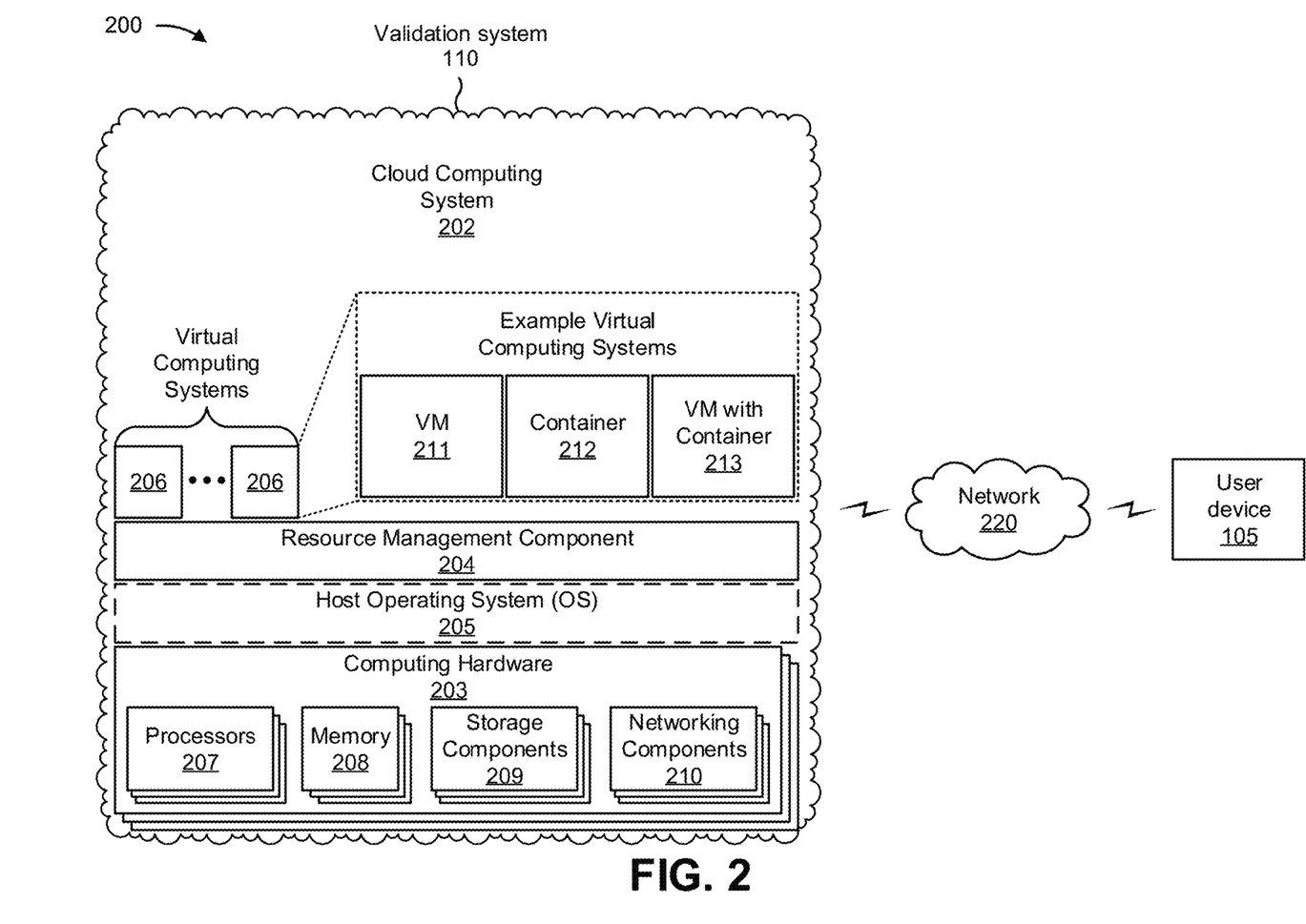
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the validation system 110, which may include one or more elements of and/or may execute within a cloud computing system 202. The cloud computing system 202 may include one or more elements 203-213, as described in more detail below. As further shown in FIG. 2, environment 200 may include a network 220 and user device 105. Devices and/or elements of environment 200 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the validation system 110 may include one or more elements 203-213 of the cloud computing system 202, may execute within the cloud computing system 202, and/or may be hosted within the cloud computing system 202, in some implementations, the validation system 110 may not be cloud-based (e.g., may be implemented outside of a cloud computing system) or may be partially cloud-based. For example, the validation system 110 may include one or more devices that are not part of the cloud computing system 202, such as device 300 of FIG. 3, which may include a standalone server or another type of computing device. The validation system 110 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, a core network (e.g., a fifth generation (5G) core network, a fourth generation (4G) core network, and/or the like), an edge network (e.g., a network that brings computation and data storage closer to a location to improve response times and save bandwidth), a far edge network (e.g., a network of location-based devices, such as customer premise equipment), and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
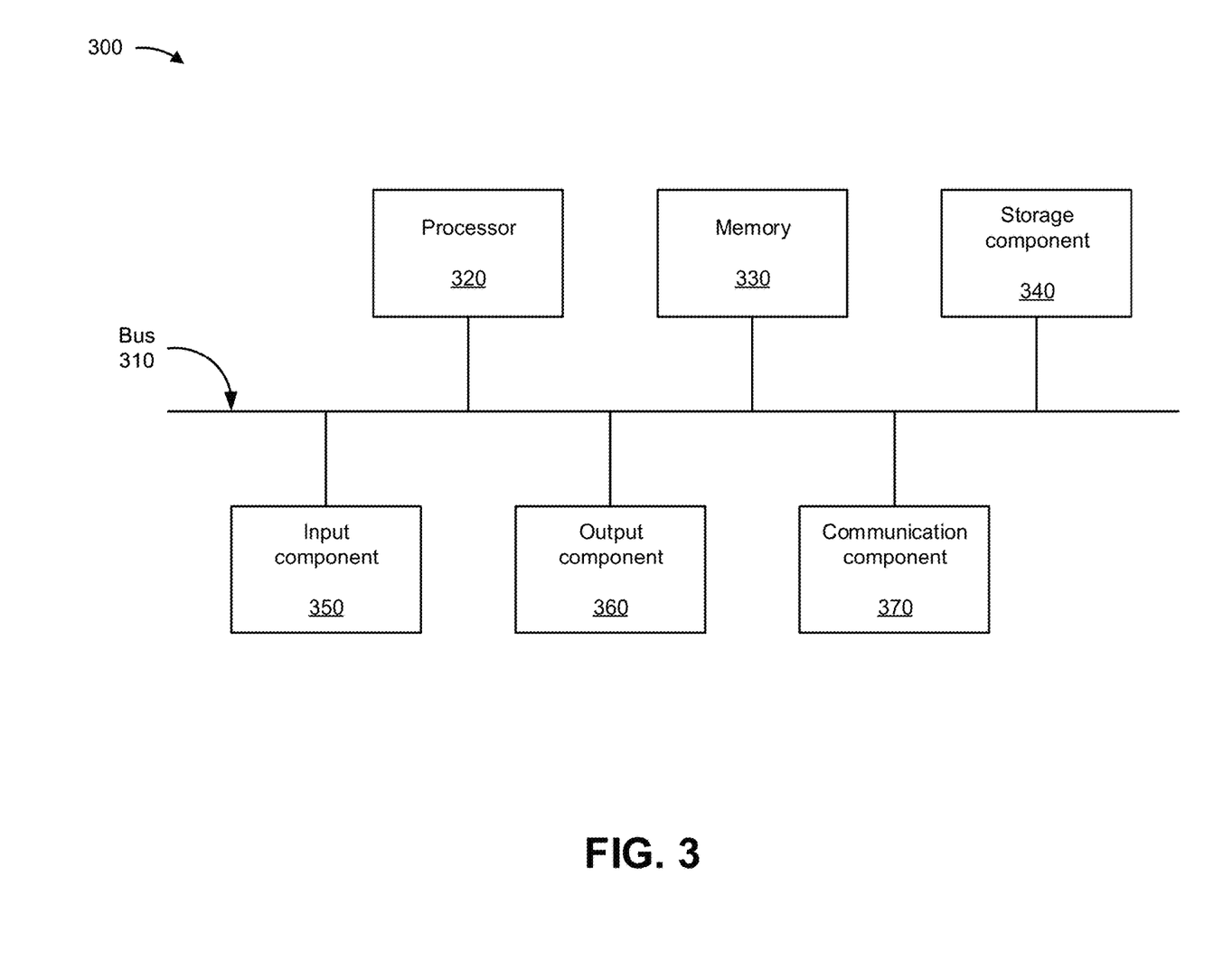
FIG. 3 is a diagram of example components of one or more devices of FIG. 2.

FIG. 3 is a diagram of example components of one or more devices of FIG. 2. The one or more devices may include a device 300, which may correspond to the user device 105 and/or the validation system 110. In some implementations, the user device 105 and/or the validation system 110 may include one or more devices 300 and/or one or more components of the device 300. As shown in FIG. 3, the device 300 may include a bus 310, a processor 320, a memory 330, a storage component 340, an input component 350, an output component 360, and a communication component 370.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The storage component 340 stores information and/or software related to the operation of device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
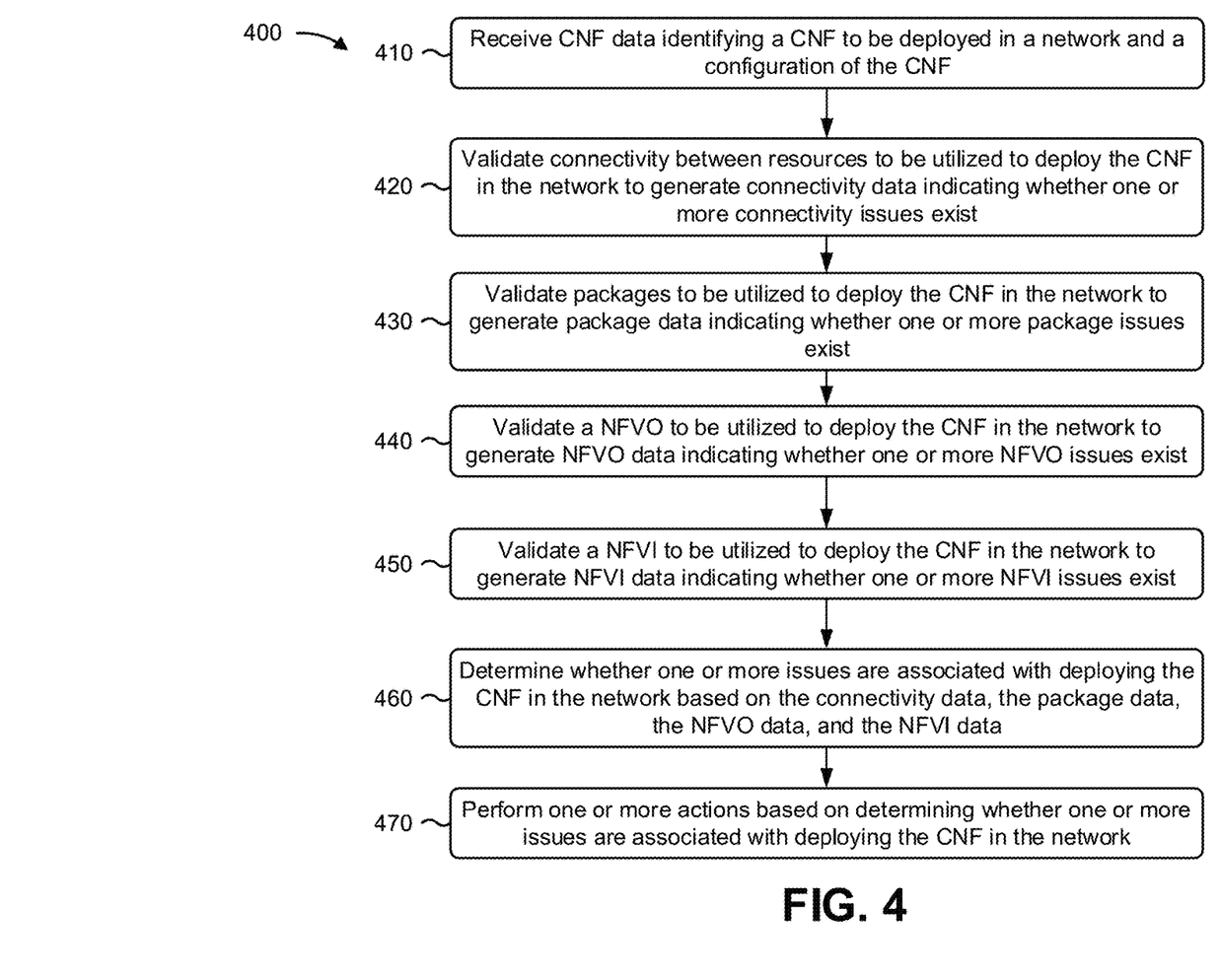
FIG. 4 is a flowchart of an example process for validating a CNF for deployment.

FIG. 4 is a flowchart of an example process 400 for validating a CNF for deployment. In some implementations, one or more process blocks of FIG. 4 may be performed by a device (e.g., the validation system 110). In some implementations, one or more process blocks of FIG. 4 may be performed by another device or a group of devices separate from or including the device, such as a user device (e.g., the user device 105). Additionally, or alternatively, one or more process blocks of FIG. 4 may be performed by one or more components of the device 300, such as the processor 320, the memory 330, the storage component 340, the input component 350, the output component 360, and/or the communication component 370.

As shown in FIG. 4, process 400 may include receiving CNF data identifying a CNF to be deployed in a network and a configuration of the CNF (block 410). For example, the device may receive CNF data identifying a CNF to be deployed in a network and a configuration of the CNF, as described above.

As further shown in FIG. 4, process 400 may include validating connectivity between resources to be utilized to deploy the CNF in the network to generate connectivity data indicating whether one or more connectivity issues exist (block 420). For example, the device may validate connectivity between resources to be utilized to deploy the CNF in the network to generate connectivity data indicating whether one or more connectivity issues exist, as described above. In some implementations, validating the connectivity between the resources to be utilized to deploy the CNF in the network to generate the connectivity data includes validating connectivity between the NFVO and container infrastructure service management to generate first connectivity data, and validating connectivity between the network and the NFVO to generate second connectivity data, wherein the connectivity data includes the first connectivity data and the second connectivity data. In some implementations, the one or more connectivity issues include one or more of a configuration management issue, a container infrastructure service management issue, a package manager issue, or a repository issue.

As further shown in FIG. 4, process 400 may include validating packages to be utilized to deploy the CNF in the network to generate package data indicating whether one or more package issues exist (block 430). For example, the device may validate packages to be utilized to deploy the CNF in the network to generate package data indicating whether one or more package issues exist, as described above. In some implementations, validating the packages to be utilized to deploy the CNF in the network to generate the package data includes validating the packages to generate first package data, and validating artifacts associated with the packages, to generate second package data, wherein the package data includes the first package data and the second package data. In some implementations, the one or more package issues include one or more of a missing artifact issue associated with one of the packages, or an issue with an image push to a local registry.

As further shown in FIG. 4, process 400 may include validating an NFVO to be utilized to deploy the CNF in the network to generate NFVO data indicating whether one or more NFVO issues exist (block 440). For example, the device may validate an NFVO to be utilized to deploy the CNF in the network to generate NFVO data indicating whether one or more NFVO issues exist, as described above. In some implementations, validating the NFVO to be utilized to deploy the CNF in the network to generate the NFVO data includes validating package cataloging by the NFVO to generate first NFVO data, validating functionality of the NFVO to generate second NFVO data, and validating resources discovery, associated with the NFVO, to generate third NFVO data, wherein the NFVO data includes the first NFVO data, the second NFVO data, and the third NFVO data. In some implementations, the one or more NFVO issues include one or more of a data center discovery issue, an improper hierarchy issue, or an unattached package issue.

As further shown in FIG. 4, process 400 may include validating an NFVI to be utilized to deploy the CNF in the network to generate NFVI data indicating whether one or more NFVI issues exist (block 450). For example, the device may validate an NFVI to be utilized to deploy the CNF in the network to generate NFVI data indicating whether one or more NFVI issues exist, as described above. In some implementations, validating the NFVI to be utilized to deploy the CNF in the network to generate the NFVI data includes validating a namespace, associated with the NFVI, to generate first NFVI data, validating a quota, associated with the NFVI, to generate second NFVI data, and validating a namespace label, associated with the NFVI, to generate third NFVI data, wherein the NFVI data includes the first NFVI data, the second NFVI data, and the third NFVI data. In some implementations, the one or more NFVI issues include one or more of a resource quota availability issue, a service account related issue, a missing label issue, or an improperly configured role-based access control issue.

As further shown in FIG. 4, process 400 may include determining whether one or more issues are associated with deploying the CNF in the network based on the connectivity data, the package data, the NFVO data, and the NFVI data (block 460). For example, the device may determine whether one or more issues are associated with deploying the CNF in the network based on the connectivity data, the package data, the NFVO data, and the NFVI data, as described above.

As further shown in FIG. 4, process 400 may include performing one or more actions based on determining whether one or more issues are associated with deploying the CNF in the network (block 470). For example, the device may perform one or more actions based on determining whether one or more issues are associated with deploying the CNF in the network, as described above. In some implementations, performing the one or more actions based on determining whether one or more issues are associated with deploying the CNF in the network includes creating a report identifying the one or more issues and providing the report for display; generating a recommendation for deployment of the CNF based on the one or more issues and providing the recommendation for display; generating a recommendation for correcting the one or more issues and providing the recommendation for display; correcting the one or more issues to generate a corrected CNF package and causing the corrected CNF package to be implemented; causing the CNF to be deployed in the network in lieu of the one or more issues; or receiving feedback associated with the one or more issues and updating the CNF based on the feedback.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    performing, by a device, validation associated with deploying a container network function (CNF) in a network,
        wherein performing the validation comprises checking prerequisite tasks for deploying the CNF in the network;
    determining, by the device and based on performing the validation, whether one or more issues are associated with deploying the CNF in the network based on applying weights to particular criticalities of issues identified in connectivity data, package data, network functions virtualization orchestrator (NFVO) data, and network functions virtualization infrastructure (NFVI) data; and performing, by the device, one or more actions based on determining whether the one or more issues are associated with deploying the CNF in the network.

2. The method of claim 1, further comprising:
determining a criticality of an issue of the one or more issues.

3. The method of claim 1, wherein performing the validation comprises:
validating connectivity between resources to be utilized to deploy the CNF in the network,
validating packages to be utilized to deploy the CNF in the network,
validating a NFVO to be utilized to deploy the CNF in the network, or
validating a NFVI to be utilized to deploy the CNF in the network.

4. The method of claim 1, wherein performing the one or more actions comprises:
receiving feedback associated with the one or more issues; and
updating the CNF based on the feedback.

5. The method of claim 1, wherein performing the one or more actions comprises:
causing the CNF to be deployed in the network in lieu of the one or more issues based on the one or more issues failing to satisfy a threshold criticality.

6. The method of claim 1, wherein performing the one or more actions comprises:
correcting the one or more issues to generate a corrected CNF package, and
causing the corrected CNF package to be implemented.

7. The method of claim 1, wherein performing the one or more actions comprises:
generating a recommendation for deployment of the CNF based on the one or more issues, and
providing the recommendation for display.

8. A device, comprising:
one or more processors configured to:
perform validation associated with deploying a container network function (CNF) in a network,
wherein the one or more processors, to perform the validation, are configured to check prerequisite tasks for deploying the CNF in the network;
determine, based on performing the validation, whether one or more issues are associated with deploying the CNF in the network based on applying weights to particular criticalities of issues identified in connectivity data, package data, network functions virtualization orchestrator (NFVO) data, and network functions virtualization infrastructure (NFVI) data; and
perform one or more actions based on determining whether the one or more issues are associated with deploying the CNF in the network.

9. The device of claim 8, wherein the one or more processors are further configured to:
determine a criticality of connectivity issues of the one or more issues,
determine a criticality of package issues of the one or more issues,
determine a criticality of NFVO issues of the one or more issues, or
determine a criticality of NFVI issues of the one or more issues.

10. The device of claim 8, wherein the one or more processors, to perform the validation, are configured to:
validate packages to be utilized to deploy the CNF in the network to generate the package data indicating whether one or more packages exist.

11. The device of claim 8, wherein the one or more processors, to perform the one or more actions, are configured to:
create a report identifying the one or more issues; and
provide the report for display.

12. The device of claim 8, wherein the one or more processors, to perform the validation, are configured to:
generate first package data indicating whether one or more package issues exist with packages to be utilized to deploy the CNF in the network.

13. The device of claim 8, wherein the one or more processors, to perform the validation, are configured to:
validate artifacts associated with packages to be utilized to deploy the CNF in the network to generate second package data indicating whether one or more package issues exist with the artifacts associated with the packages.

14. The device of claim 8, wherein the one or more processors, to perform the validation, are configured to:
validate connectivity between a NFVO and container infrastructure service management to generate the connectivity data indicating whether one or more connectivity issues exist between the NFVO and the container infrastructure service management.

15. A non-transitory computer-readable medium storing a set of instructions, the set of instructions comprising:
one or more instructions that, when executed by one or more processors of a device, cause the device to:
perform validation associated with deploying a container network function (CNF) in a network,
wherein the one or more instructions, that cause the device to perform the validation, cause the device to check prerequisite tasks for deploying the CNF in the network;
determine, based on performing the validation, whether one or more issues are associated with deploying the CNF in the network based on applying weights to particular criticalities of issues identified in connectivity data, package data, network functions virtualization orchestrator (NFVO) data, and network functions virtualization infrastructure (NFVI) data; and
perform one or more actions based on determining whether the one or more issues are associated with deploying the CNF in the network.

16. The non-transitory computer-readable medium of claim 15, wherein the one or more instructions further cause the device to:
determine a criticality of the one or more issues based on weighted criticalities associated with one or more of:
a criticality of connectivity issues of the one or more issues,
a criticality of package issues of the one or more issues,
a criticality of NFVO of the one or more issues, or
a criticality of NFVI issues of the one or more issues.

17. The non-transitory computer-readable medium of claim 15, wherein the one or more instructions, that cause the device to perform the validation, cause the device to:
validate connectivity between a NFVO and the network to generate the connectivity data indicating whether one or more connectivity issues exist between the NFVO and the network.

18. The non-transitory computer-readable medium of claim 15, wherein the one or more instructions, that cause the device to perform the validation, cause the device to:
   validate package cataloguing by a NFVO to generate the NFVO data indicating whether NFVO one or more issues exist with the package cataloguing by the NFVO.

19. The non-transitory computer-readable medium of claim 15, wherein the one or more instructions, that cause the device to perform the validation, cause the device to:
   validate functionality of a NFVO to generate the NFVO data indicating whether one or more NFVO issues exist with the functionality of the NFVO.

20. The non-transitory computer-readable medium of claim 15, wherein the one or more instructions, that cause the device to perform the validation, cause the device to:
   validate an NFVI to be utilized to deploy the CNF in the network to generate the NFVI data indicating whether one or more NFVI issues exist.

* * * * *